US008852373B2

(12) United States Patent
Cheng

(10) Patent No.: US 8,852,373 B2
(45) Date of Patent: Oct. 7, 2014

(54) METHOD FOR MANUFACTURING LACE TIP AND LACE TIP

(75) Inventor: Sen-Mei Cheng, Chang Hwa Hsien (TW)

(73) Assignee: Taiwan Paiho Limited, Chang Hwa Hsien (TW)

( * ) Notice: Subject to any disclaimer, the term of this patent is extended or adjusted under 35 U.S.C. 154(b) by 423 days.

(21) Appl. No.: 13/206,524

(22) Filed: Aug. 10, 2011

(65) Prior Publication Data

US 2012/0144632 A1 Jun. 14, 2012

(30) Foreign Application Priority Data

Dec. 10, 2010 (TW) ................................ 99143292 A

(51) Int. Cl.
*A43C 9/04* (2006.01)
*B29C 63/18* (2006.01)
*B29C 63/48* (2006.01)

(52) U.S. Cl.
CPC . *A43C 9/04* (2013.01); *B29C 63/18* (2013.01); *B29C 2063/485* (2013.01)
USPC .......................................................... 156/219

(58) Field of Classification Search
CPC ..... A43C 9/04; B29C 2063/485; B29C 68/18
USPC .......................................................... 156/219
See application file for complete search history.

(56) References Cited

U.S. PATENT DOCUMENTS 1,691,451 A * 11/1928 Uellendahl .................. 24/715.4

FOREIGN PATENT DOCUMENTS

| | | | |
|---|---|---|---|
| CN | 2372947 | Y | 4/2000 |
| CN | 2735799 | Y | 10/2005 |
| CN | 201036387 | | 3/2008 |
| CN | 101223037 | A | 7/2008 |
| TW | 384642 | | 3/2000 |
| TW | 559099 | | 10/2003 |
| TW | 587424 | | 5/2004 |
| TW | 587425 | | 5/2004 |
| TW | M257658 | | 3/2005 |
| TW | M278267 | | 10/2005 |
| TW | 311977 | | 5/2007 |
| TW | M321228 | | 11/2007 |
| TW | 408263 | | 8/2011 |

* cited by examiner

*Primary Examiner* — Jeff Aftergut
*Assistant Examiner* — Jaeyun Lee
(74) *Attorney, Agent, or Firm* — CKC & Partners Co., Ltd.

(57) ABSTRACT

A method for manufacturing a lace tip includes: A glue layer, a pattern layer and a transparent layer are stacked in sequence on a predetermined location of a lace body. A surface of the pattern layer includes a plurality of first portions and a plurality of second portions which are alternately arranged on the pattern layer. The glue layer, the pattern layer and the transparent layer are fixed in sequence on the predetermined location of the lace body by thermal pressing. A plurality of concave portions and a plurality of convex portions are formed on a surface of the transparent layer which are alternately arranged on the surface of the transparent layer, so that the concave portions or the convex portions can refract light through the first portions and the second portions in accordance with changes of user's view angle.

1 Claim, 8 Drawing Sheets

METHOD FOR MANUFACTURING LACE TIP AND LACE TIP

RELATED APPLICATIONS

The application claims priority to Taiwan Application Serial Number 099143292, filed Dec. 10, 2010, which is herein incorporated by reference.

BACKGROUND

1. Technical Field

The present invention relates to a method for manufacturing a lace tip. More particularly, the present invention relates to a method for manufacturing a lace tip which can generate visual changes.

2. Description of Related Art

Currently, the laces existing in the market mostly are shoe laces or flexible laces used for adjusting the tightness of clothes. A lace generally has lace tips (aglets) disposed on its both ends for preventing the fibers of the lace body from being loosened, and a manufacturer often forms a trademark or decoration pattern on the lace tip.

In general, the pattern on the lace tip is permanently formed on the lace body, and the pattern cannot vary with a user's different sightlines. Therefore, the user often would not pay more attention to the pattern on the lace tip. The product for designing a trademark pattern on a lace body cannot achieve the effects of promotion and impression enhancement. A conventional lace tip includes a transparent body attached to a surface of a transparent layer and enclosing a pattern, so that the light can be refracted by the transparent body. But during the usage of the lace tip, the transparent body is very likely to be peeled off from the transparent layer due to rubbing, and the pattern cannot generate the apparent vision change effects merely by the refraction through the transparent body.

SUMMARY

One aspect of the present invention is to provide a method for manufacturing a lace tip which can generate vision effects of color changes in accordance with changes of user's view angle.

According to one embodiment of the present invention, in the method for manufacturing the lace tip, a glue layer, a pattern layer and a transparent layer are stacked in sequence on a predetermined location of a lace body. A surface of the pattern layer includes a plurality of first portions and a plurality of second portions, wherein the first portions and the second portions are alternately arranged on the pattern layer. The glue layer, the pattern layer and the transparent layer are fixed in sequence on the predetermined location of the lace body by at least one time of thermal pressing. A plurality of concave portions and a plurality of convex portions are formed on a surface of the transparent layer, wherein the concave portions and the convex portions are alternately arranged on the surface of the transparent layer, the concave portions or the convex portions can refract light through the first portions and the second portions in accordance with changes of user's view angle.

Another aspect of the present invention is to provide a lace tip manufactured by the aforementioned method, wherein the lace tip can generate vision effects of color changes in accordance with changes of user's view angle.

According to one embodiment of the present invention, the lace tip includes the glue layer, the pattern layer and the transparent layer. The glue layer covers on the predetermined location of the lace body. The pattern layer covers and is connected to the predetermined location of the lace body via the glue layer. The pattern layer includes the first portions and the second portions. The second portions and the first portions are alternately arranged on the pattern layer. The transparent layer covers and is connected to the pattern layer. The transparent layer includes the concave portions and the convex portions. The convex portions and the concave portions are alternately arranged on the surface of the transparent layer.

According to the lace tip of the aforementioned embodiment, the first portions of the pattern layer and the second portions of the pattern layer can be stripe-shaped and the cross-section of the concave portions of the transparent layer and the convex portions of the transparent layer can be saw-tooth-shaped, and the concave portions and the convex portions correspond to the first portions and the second portions respectively.

According to the lace tip of the aforementioned embodiment, the convex portions of the transparent layer are protrusions with arc surfaces which protrude from an external surface of the transparent layer and are corresponding to the first portions of the pattern layer, wherein the first portions of the pattern layer can be dot-shaped.

Another aspect of the present invention is to provide a method for manufacturing a lace tip which can generate vision effects of color changes in accordance with changes of user's view angle.

According to one embodiment of the present invention, in the method for manufacturing the lace tip, a plurality of concave portions and a plurality of convex portions are formed on a surface of a hollow tube-shaped transparent layer, wherein the concave portions and the convex portions are alternately arranged on the surface of the transparent layer. A glue layer is coated over a predetermined location of a lace body. The predetermined location of the lace body is enclosed with a pattern layer and the transparent layer and the pattern layer is connected to the predetermined location of the string via the glue layer. The pattern layer includes a plurality of first portions and a plurality of second portions, and the first portions and the second portions are alternately arranged on the surface of the pattern layer, wherein the concave portions or the convex portions can refract light through the first portions and the second portions in accordance with changes of user's view angle. Both ends of the transparent layer are fixed on the lace body by thermal pressing.

Another aspect of the present invention is to provide a lace tip manufactured by the aforementioned method, wherein the lace tip can generate vision effects of color changes in accordance with changes of user's view angle.

According to one embodiment of the present invention, the lace tip includes the glue layer, the pattern layer and the transparent layer. The glue layer covers on the predetermined location of the lace body. The pattern layer covers and is connected to the predetermined location of the lace body via the glue layer. The pattern layer includes the first portions and the second portions, wherein the second portions and the first portions are alternately arranged on the pattern layer. The transparent layer covers and is connected to the pattern layer. The transparent layer includes the concave portions and the convex portions, wherein the convex portions and the concave portions are alternately arranged on the surface of the transparent layer.

According to the lace tip of the aforementioned embodiment, the first portions of the pattern layer and the second portions of the pattern layer can be stripe-shaped and the cross-section of the concave portions of the transparent layer and the convex portions of the transparent layer can be sawtooth-shaped, and the concave portions and the convex portions correspond to the first portions and the second portions respectively.

According to the lace tip of the aforementioned embodiment, the convex portions of the transparent layer can be protrusions with arc surfaces which protrude from an external surface of the transparent layer and are corresponding to the first portions of the pattern layer, wherein the first portions of the pattern layer can be dot-shaped. Further, the convex portions of the transparent layer can protrude from the internal surface of the transparent layer and are corresponding to the first portions of the pattern layer.

DETAILED DESCRIPTION

Figure 1:
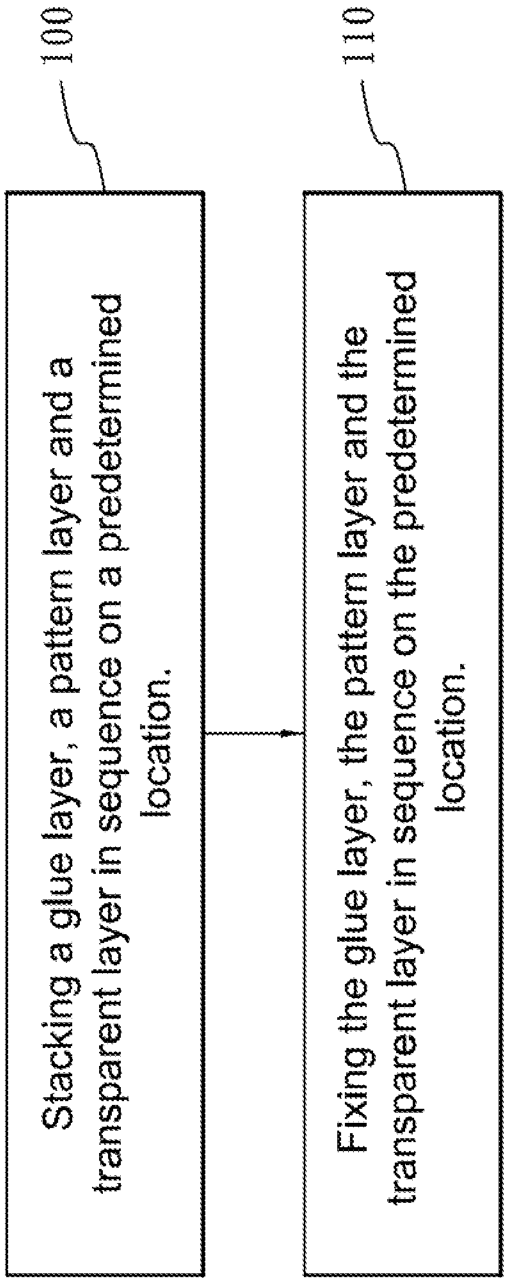
FIG. 1 is a flowchart showing a method for manufacturing a lace tip according to one embodiment.

FIG. 1 is a flowchart showing a method for manufacturing a lace tip according to one embodiment. The method for manufacturing the lace tip includes the following steps.

Step 100: A glue layer, a pattern layer and a transparent layer are stacked in sequence on a predetermined location of a lace body. A surface of the pattern layer includes a plurality of first portions and a plurality of second portions, wherein the first portions and the second portions are alternately arranged on the pattern layer.

Step 110: The glue layer, the pattern layer and the transparent layer are fixed in sequence on the predetermined location of the lace body by at least one time of thermal pressing. A plurality of concave portions and a plurality of convex portions are formed on a surface of the transparent layer, wherein the concave portions and the convex portions are alternately arranged on the surface of the transparent layer. Therefore, the concave portions or the convex portions can refract light through the first portions and the second portions in accordance with changes of users view angle.

Figure 2:
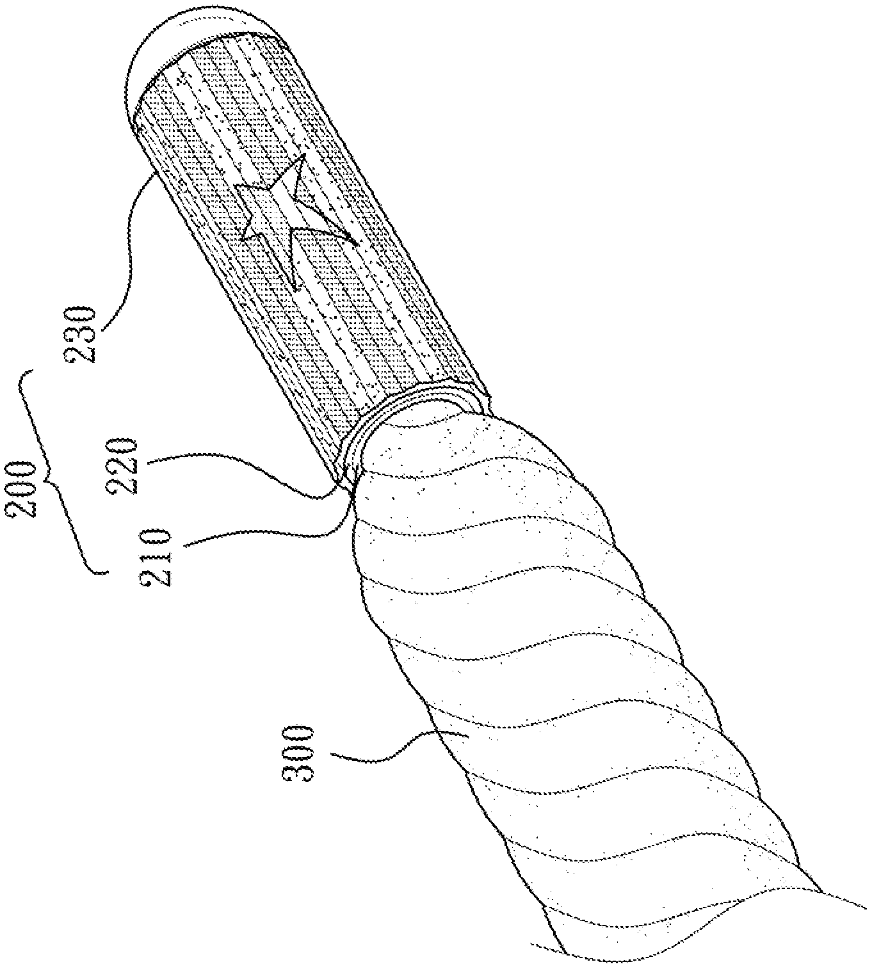
FIG. 2 is a three dimensional view of a lace tip manufactured by the method shown in FIG. 1.

FIG. 2 is a three dimensional view of the lace tip 200 manufactured by the method shown in FIG. 1. The lace tip 200 includes the glue layer 210, the pattern layer 220 and the transparent layer 230. The glue layer 210 covers on the predetermined location of the lace body 300. The pattern layer 220 covers and is connected to the predetermined location of the lace body 300 via the glue layer 210. The transparent layer 230 covers and is connected to the pattern layer 220.

Figure 3:
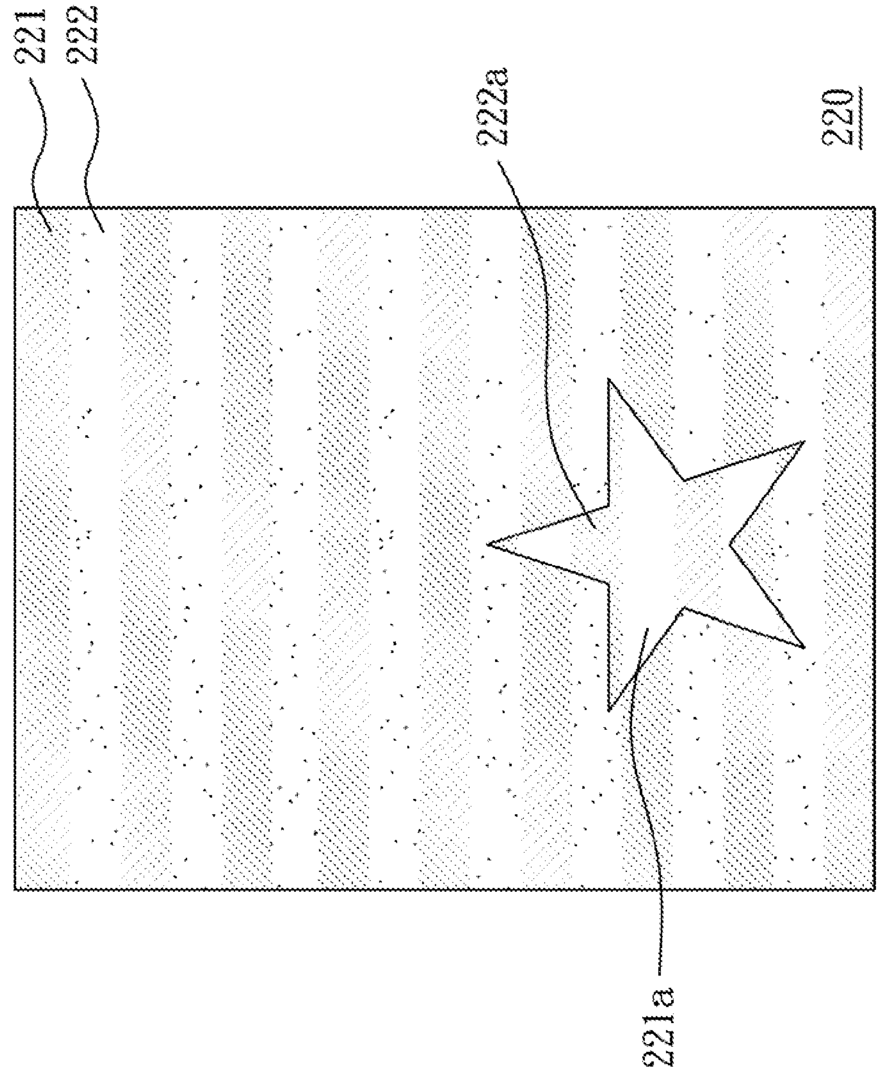
FIG. 3 is a front view of the pattern layer shown in FIG. 2.

FIG. 3 is a front view of the pattern layer 220 shown in FIG. 2. A surface of the pattern layer 220 includes the first portions 221 and the second portions 222, wherein the second portions 222 and the first portions 221 are alternately arranged on the pattern layer 220. In FIG. 3, the first portions 221 and the second portions 222 are different colors and stripe-shaped. Furthermore, the pattern layer 220 can include the pattern portions 221*a*, 222*a*, which are different colors and located on the first portions 221 and the second portions 222. Therefore, the manufacturer can set the pattern or the trademark on the lace tip 200.

Figure 4:
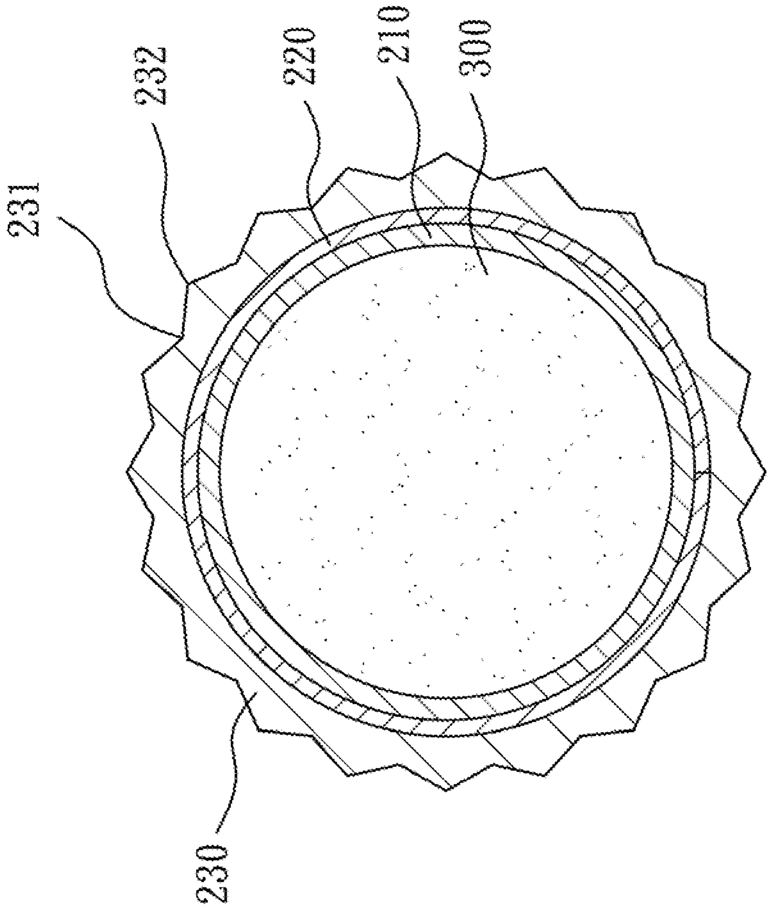
FIG. 4 is a cross-sectional view of the lace tip shown in FIG. 2.

FIG. 4 is a cross-sectional view of the lace tip shown in FIG. 2. A surface of the transparent layer 230 includes the concave portion 231 and the convex portions 232, wherein the convex portions 232 and the concave portions 231 are alternately arranged on the surface of the transparent layer 230. In this embodiment, the cross-section of the concave portions 231 of the transparent layer 230 and the convex portions 232 of the transparent layer 230 are sawtooth-shaped, and the concave portions 231 and the convex portions 232 correspond to the first portions 221 and the second portions 222 respectively.

When a user changes his view angle at the surface of the transparent layer 230, the convex portion 231 and the concave 232 portion of the surface of the transparent layer 230 refract the light in different angles, so that the user can see the variation of color and pattern of the first portions 221 and the second portions 222 of the pattern layer 220 by changing the angle of a sightline at the lace tip 200. Therefore, the consumer may be attracted by the variation and novelty of the lace tip 200.

In this embodiment, the pattern layer 220 can be a paper with pattern or the pattern which is printed or stamped on the glue layer 210.

Furthermore, the predetermined location can be located on both ends of the lace 300, and also can be located on other location of the lace 300.

Figure 5:
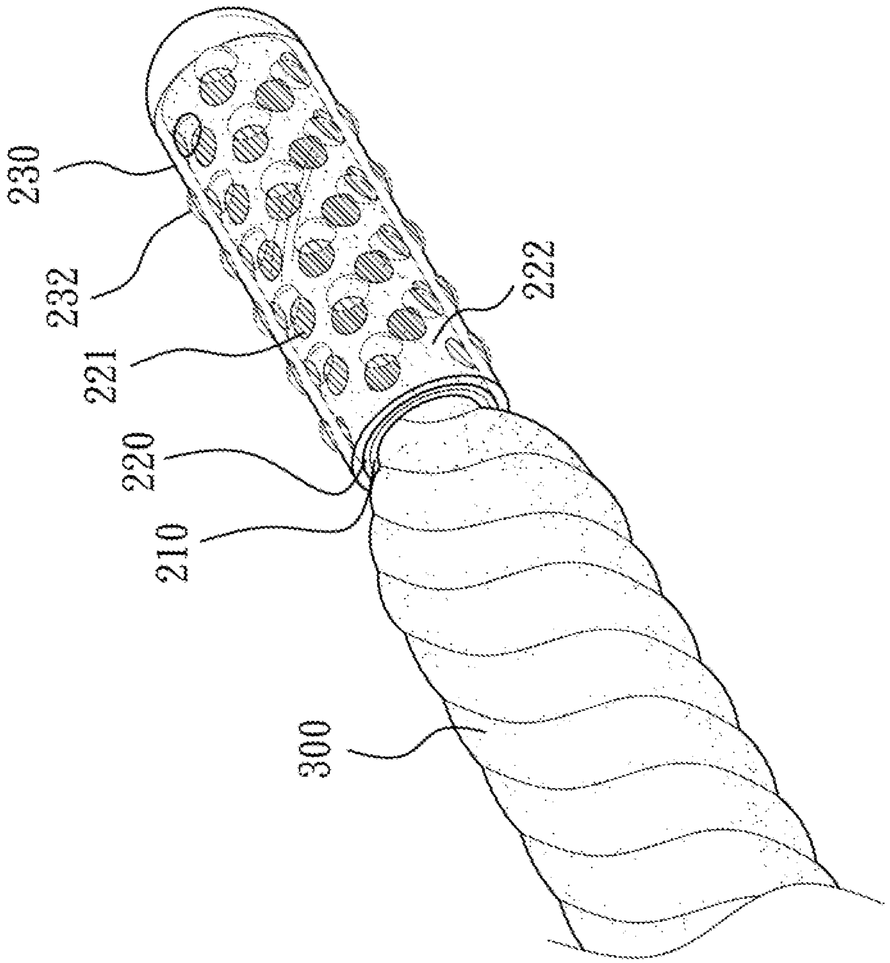
FIG. 5 a three dimensional view of another lace tip manufactured by the method shown in FIG. 1.

FIG. 5 a three dimensional view of another lace tip 200 manufactured by the method shown in FIG. 1. In FIG. 5, the first portions 221 of the pattern layer 220 are dot-shaped. The convex portions 232 of the transparent layer 230 are protrusions with arc surfaces which protrude from an external surface of the transparent layer 230 and are corresponding to the first portions 221 of the pattern layer 220. Therefore, the convex portions 232 with the arc surfaces can refract the light at different angle, and the user can see the variation of color and pattern of the first portions 221 and the second portions 222 of the pattern layer 220 by changing the angle of a sightline at the lace tip 200.

Figure 6:
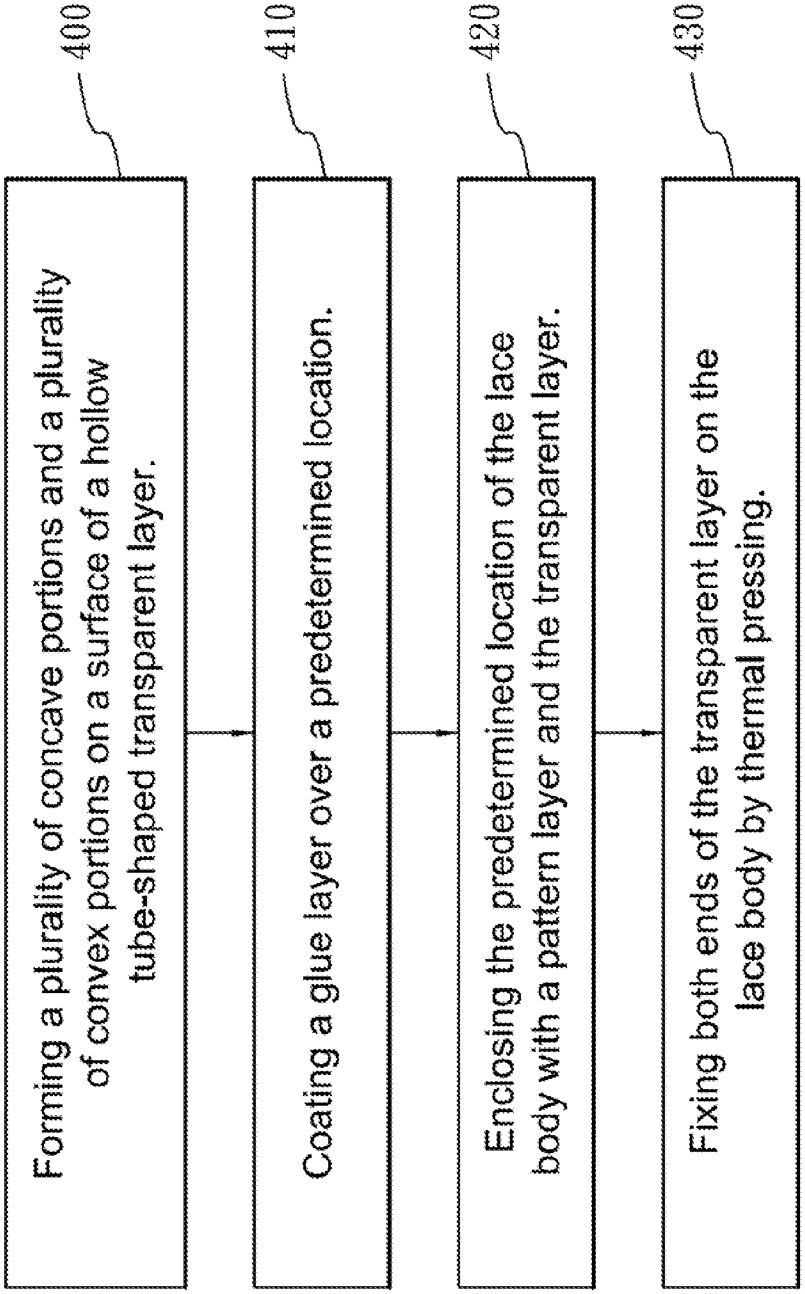
FIG. 6 is a flowchart showing a method for manufacturing a lace tip according to another embodiment.

FIG. 6 is a flowchart showing a method for manufacturing a lace tip according to another embodiment. The method for manufacturing the lace tip includes the following steps.

Step 400: A plurality of concave portions and a plurality of convex portions are formed on a surface of a hollow tube-shaped transparent layer, wherein the concave portions and the convex portions are alternately arranged on the surface of the transparent layer.

Step 410: A glue layer is coated over a predetermined location of a lace body.

Step 420: The predetermined location of the lace body is enclosed with a pattern layer and the transparent layer, and the pattern layer is connected to the predetermined location of the string via the glue layer. The pattern layer includes a plurality of first portions and a plurality of second portions, and the first portions and the second portions are alternately arranged on the surface of the pattern layer, wherein the concave portions or the convex portions can refract light through the first portions and the second portions in accordance with changes of user's view angle.

Step 430: Both ends of the transparent layer are fixed on the lace body by thermal pressing.

In comparison with the method for manufacturing a lace tip in FIG. 1, in the method in FIG. 6, the concave portions and the convex portions are formed on the surface of the transparent layer first. In this way, the concave portions and the convex portions not only can be formed on the external surface of the transparent layer, but also can be formed on the internal surface of the transparent layer, then enclosing the predetermined location of the lace with the transparent layer.

Figure 7:
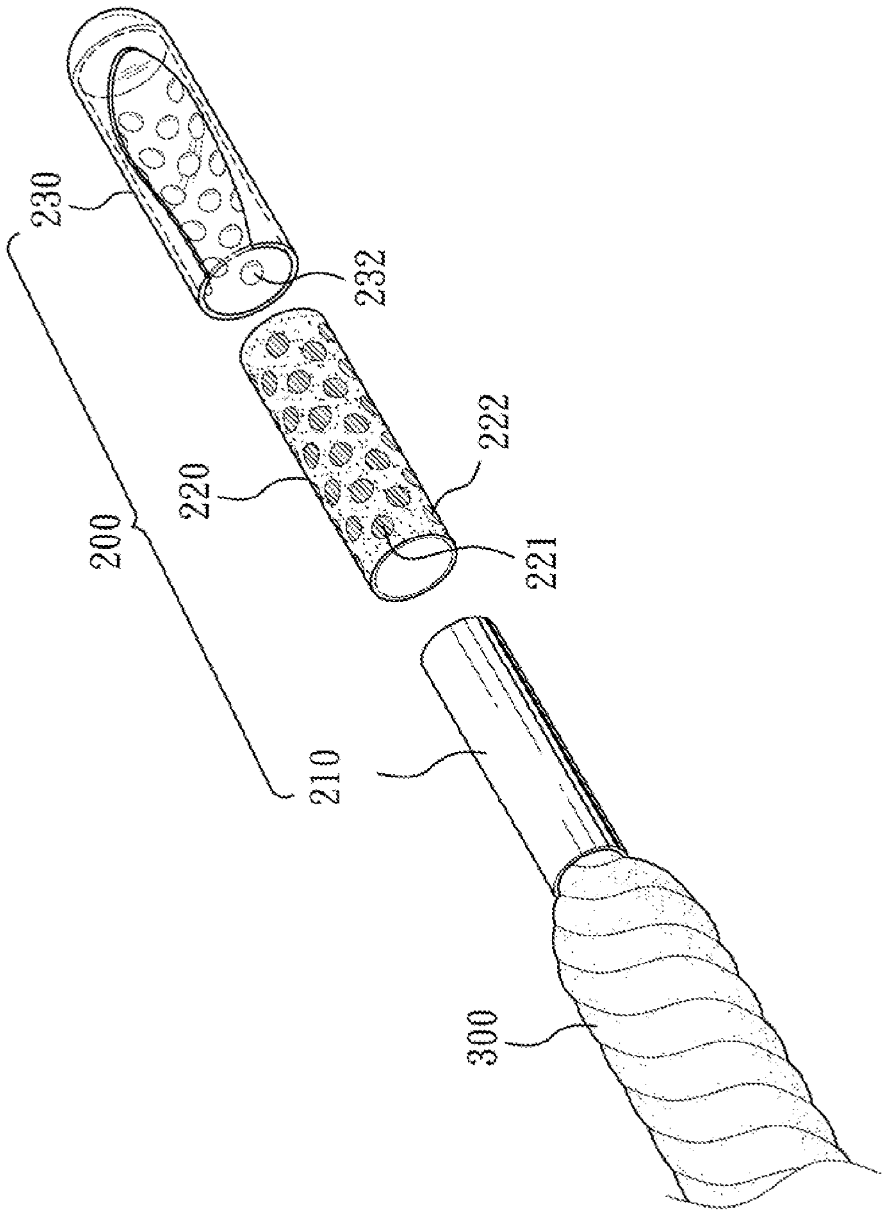
FIG. 7 is an exploded view of a lace tip manufactured by the method shown in FIG. 6.
Figure 8:
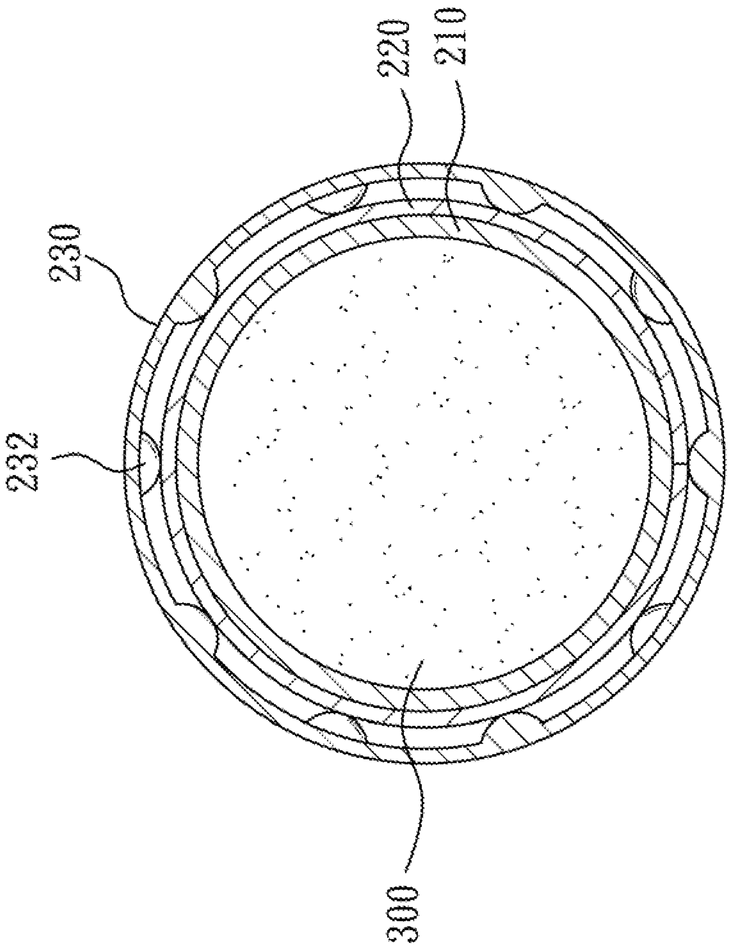
FIG. 8 is a cross-sectional view of the lace tip manufactured by the method shown in FIG. 6.

Referring to FIG. 7 and FIG. 8, FIG. 7 is an exploded view of a lace tip 200 manufactured by the method shown in FIG. 6, and FIG. 8 is a cross-sectional view of the lace tip 200 manufactured by the method shown in FIG. 6. In comparison with the lace tip 200 shown in FIGS. 2-5, the convex portions 232 of the transparent layer 230 are protrusions with arc surfaces which protrude from an external surface of the transparent layer 230 in FIGS. 7 and 8. The convex portions 232 are corresponding to the first portions 221 of the pattern layer 220, wherein the first portions 221 of the pattern layer 220 are dot-shaped.

Therefore, in comparison with the convex portions 232 formed on the external surface of the transparent layer 230, the convex portions 232 formed on the internal surface of the transparent layer 230 can refract the light in different angles, providing different visual effect.

In this embodiment, the predetermined location can be located on both ends of the lace body 300, and also can be located on other location of the lace 300.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for manufacturing a lace tip, the method comprising:

stacking a glue layer, a pattern layer and a transparent layer in sequence on a predetermined location of a lace body, wherein a surface of the pattern layer comprises a plurality of first portions and a plurality of second portions, wherein the first portions and the second portions are alternately arranged on the pattern layer;

fixing the glue layer, the pattern layer and the transparent layer in sequence on the predetermined location of the lace body by at least one time of thermal pressing, and forming a plurality of concave portions and a plurality of convex portions on a surface of the transparent layer, wherein the concave portions and the convex portions are alternately arranged on the surface of the transparent layer, so that the concave portions or the convex portions can refract light through the first portions and the second portions in accordance with changes of user's view angle.

* * * * *